US011045769B2

(12) United States Patent
Rich et al.

(10) Patent No.: US 11,045,769 B2
(45) Date of Patent: Jun. 29, 2021

(54) SUBMERGED MEMBRANE UNIT DIFFUSER CASE

(71) Applicant: OVIVO INC., Montreal (CA)

(72) Inventors: Clay Brandon Rich, Leander, TX (US); Rick Whisenant, Cedar Park, TX (US); Clyde Wayne Holliman, Austin, TX (US); Dennis Livingston, Austin, TX (US)

(73) Assignee: OVIVO INC., Montreal (CA)

( * ) Notice: Subject to any disclaimer, the term of this patent is extended or adjusted under 35 U.S.C. 154(b) by 0 days.

(21) Appl. No.: 16/637,035

(22) PCT Filed: Aug. 10, 2018

(86) PCT No.: PCT/CA2018/050970
§ 371 (c)(1),
(2) Date: Feb. 6, 2020

(87) PCT Pub. No.: WO2019/028559
PCT Pub. Date: Feb. 14, 2019

(65) Prior Publication Data
US 2020/0238218 A1    Jul. 30, 2020

Related U.S. Application Data

(60) Provisional application No. 62/544,405, filed on Aug. 11, 2017.

(51) Int. Cl.
*B01D 61/20* (2006.01)
*B01D 65/08* (2006.01)
(Continued)

(52) U.S. Cl.
CPC ............. *B01D 65/08* (2013.01); *B01D 61/20* (2013.01); *B01D 69/06* (2013.01); *B01D 69/08* (2013.01);
(Continued)

(58) Field of Classification Search
CPC ............... B01D 65/08; B01D 2313/26; B01D 2321/185; C02F 3/1273; C02F 2303/20
See application file for complete search history.

(56) References Cited

U.S. PATENT DOCUMENTS 4,720,360 A    1/1988 Melber
4,863,644 A    9/1989 Harrington et al.
(Continued)

FOREIGN PATENT DOCUMENTS

CN    104743663 A       7/2015
CN    104743666 A   *   7/2015
(Continued)

OTHER PUBLICATIONS

Fan YAOBO—CN-104743666—A machine translation—2015 (Year: 2015).*
(Continued)

*Primary Examiner* — Bradley R Spies

(57) ABSTRACT

A submerged membrane unit has air diffusers located outside of the membrane area in plan view. The diffusers may be mounted in or below a diffuser case. The diffuser case may have walls to direct bubbles towards the membranes. The diffusers may be drop diffusers, for example as in a single drop diffuser assembly. The membrane unit may have polymeric or ceramic membranes, for example ceramic flat plate membranes. In an example, a rectangular shrouded membrane unit has a diffuser case below it that is rectangular in plan view but trapezoidal in side view, with drop diffusers located in the corners of the diffuser case. In a process of treating high strength wastewater, for example thickening or digesting waste sludge, a membrane unit optionally with ceramic plate membranes is immersed in the wastewater. The membranes are sparged with bubbles produced below but beside the membrane unit in a diffuser case.

20 Claims, 3 Drawing Sheets

(51) Int. Cl.
  *B01D 69/06* (2006.01)
  *C02F 3/12* (2006.01)
  *B01D 69/08* (2006.01)
  *B01D 71/02* (2006.01)
  *C02F 11/121* (2019.01)
  *C02F 3/20* (2006.01)

(52) U.S. Cl.
  CPC .......... *B01D 71/021* (2013.01); *C02F 3/1273* (2013.01); *C02F 3/201* (2013.01); *C02F 11/121* (2013.01); *B01D 2313/26* (2013.01); *B01D 2321/185* (2013.01); *C02F 2303/20* (2013.01)

(56) References Cited

U.S. PATENT DOCUMENTS

| | | | |
|---|---|---|---|
| 5,972,220 | A | 10/1999 | Bailey |
| 7,699,903 | B2 | 4/2010 | Stobbe et al. |
| 2008/0318309 | A1 | 12/2008 | Chang et al. |
| 2011/0110894 | A1* | 5/2011 | Drahos ............ C02F 3/34 424/93.3 |
| 2012/0152837 | A1* | 6/2012 | Tanaka ............ C02F 3/1215 210/631 |
| 2018/0243698 | A1* | 8/2018 | Tanaka ............ B01D 63/043 |

FOREIGN PATENT DOCUMENTS

| | | |
|---|---|---|
| DK | 177790 B1 | 7/2014 |
| EP | 3009182 A1 | 4/2016 |
| JP | H08-24597 A | 1/1996 |
| JP | H09-276867 A | 10/1997 |
| WO | 2010081228 A1 | 7/2010 |
| WO | 2015018420 A1 | 2/2015 |
| WO | 2017061141 A1 | 4/2017 |

OTHER PUBLICATIONS

Cembrane Clean Water for Life, New Generation Membranes: Clean Water for Life, www.cembrane.com, 8 pages.
Ovivo, Membrane Thickened Aerobic Digestion, www.ovivowater.com, 6 pages.
International Patent Application No. PCT/CA2018/050970, International Search Report and Written Opinion dated Nov. 13, 2018.
International Patent Application No. PCT/CA2018/050970, International Preliminary Report on Patentability dated Feb. 20, 2020.
Enviroquip, Inc., Enviroquip—Aeration & Aerobic Digestion Products, www.enviroquip.com, 2 pages.

* cited by examiner

SUBMERGED MEMBRANE UNIT DIFFUSER CASE

RELATED APPLICATIONS

This application is a National Stage Entry of International Application No. PCT/CA2018/050970, filed Aug. 10, 2018, which claims the benefit of priority from U.S. Provisional Patent Application No. 62/544,405, filed on Aug. 11, 2017, which is incorporated herein by reference.

FIELD

This specification relates to submerged membrane filtration systems and air scouring processes.

BACKGROUND

A membrane unit may have a collection of membrane elements, modules or cassettes, in some examples located within a membrane case and a diffuser case. Submerged membrane units (SMU), alternatively called immersed membrane units, are immersed in an open tank to separate permeate from water with suspended solids in the tank. In some examples, the water contains biologically active solids as in activated sludge or mixed liquor. Permeate is withdrawn by suction applied to the insides of the membranes. Solids in the water in the tank tend to accumulate on the outsides of the membranes. In many cases, the membranes are scoured with bubbles to inhibit fouling caused by the solids, or to remove solids from on or near the membranes. Typically, the bubbles are provided from several diffusers, alternatively called aerators or spargers, provided below the SMU. The diffusers are often provided in the form of tubes with holes along the lengths of the tubes. For example, a number of tubes can be arranged in parallel spanning the bottom of the SMU to provide a grid of holes for discharging bubbles below the SMU.

INTRODUCTION TO THE INVENTION

The inventors have observed that horizontally extending diffusers mounted below the membranes are prone to clogging, for example due to fibrous materials that wraps around them and solids that plug the holes, particularly when used in water with a high suspended solids concentration.

This specification describes an SMU with air diffusers optionally located substantially or completely outside of the membrane footprint (area in plan view). The diffusers may be point form diffusers, alternatively called drop diffusers, wherein bubbles radiate from a central position, for example through open-bottomed slots and/or the open end of a vertically oriented conduit. Each diffuser may be attached to an associated vertical drop pipe, which drop pipe is connected to only one diffuser, which may be called a single drop pipe diffuser assembly, or a single drop diffuser for brevity. Optionally, the diffusers do not include, and are not connected to, any horizontally extending pipes below the SMU or, optionally, below the water line of a tank containing the SMU. The diffusers may be mounted in or below a diffuser case. Optionally, the drop pipe may have an orifice or port accessible from above the SMU, for example from above the water line of a tank containing the SMU. Optionally, the SMU may have polymeric (including polymer coated fabric) or ceramic membranes in flat sheet or other forms. The SMU may be part of, for example, a membrane bioreactor (MBR) or sludge thickening and/or digesting system.

The specification also describes a diffuser case. The diffuser case has one or more walls extending between an upper opening and a lower opening. The upper opening generally corresponds with the size and shape of a selected SMU. In examples where the SMU has membranes within a membrane case, alternatively called a shroud, the upper opening may generally match the size and shape of the membrane case. The lower opening extends beyond the upper opening in at least one direction in plan view. One or more diffusers are located in one or more spaces between the upper opening and the lower opening in plan view. One or more of the walls may be angled to help direct bubbles emitted from the diffusers to the upper opening. In one example, the diffuser case is rectangular at its bottom edge in plan view (i.e. viewed from above) but with two angled walls in side view, with four diffusers located one in each corner of the diffuser case.

Optionally, the diffusers mentioned above may be diffusers, for example drop diffusers, of the type normally used to mix and/or aerate mixed liquor tanks, aerobic bioreactors or anaerobic digesters. A suitable diffuser is shown, for example in U.S. Pat. No. 4,720,360, which is incorporated herein by reference. Other suitable diffusers are the lower diffuser from a TRANSMAX diffuser assembly from Enviroquip, the G-O diffuser from G-H Systems Inc. or a single drop diffuser from Xylem.

This specification also describes an SMU with a diffuser. In some examples, the SMU includes ceramic plate membranes. The membranes may be, for example, as described in European Patent Application publication EP 3009182 A1 or International Publication Number WO 2015/018420, both of which are incorporated herein by reference. The ceramic plate membranes may be reaction bonded silicon carbide membranes sold by Cembrane or Ovivo, for example Cembrane 6040-DO-T-520 modules or M4, M5, M6 or M8 units. The membranes are oriented vertically and may be mounted within a membrane case. The diffusers may be provided with a diffuser case located below the module case. The diffusers may be located outside of the plan view area of the SMU. The diffusers may be diffusers of the type normally used to mix and/or aerate mixed liquor tanks, aerobic digesters or anaerobic digesters. Although these diffusers typically provide intense aeration that could damage polymeric membranes, the ceramic plate membranes are able to withstand intense aeration.

The specification also describes a process of treating high strength wastewater such as mixed liquor or sludge, for example waste activated sludge. The wastewater may have a suspended solids concentration of 18,000 mg/L or more, 25,000 mg/L or more or 30,000 mg/L or more. The wastewater treatment may comprise thickening and/or digesting sludge such as waste activated sludge, waste aerobic digester sludge or waste anaerobic digester sludge. In some examples of the process, an SMU optionally with ceramic plate membranes is immersed in the wastewater. The membranes are sparged with bubbles produced beside the SMU, or otherwise as described herein. Optionally, the bubbles are diverted towards the SMU as they rise by one or more walls of a diffuser case. The process may be, for example, part of the MEM-TAD membrane thickened aerobic digestion process by Ovivo, or a process as described in U.S. Pat. No. 5,972,220, which is incorporated herein by reference. In other examples, a diffuser and/or diffuser case as described herein is used in a membrane bioreactor (MBR).

DETAILED DESCRIPTION

Figure 1:
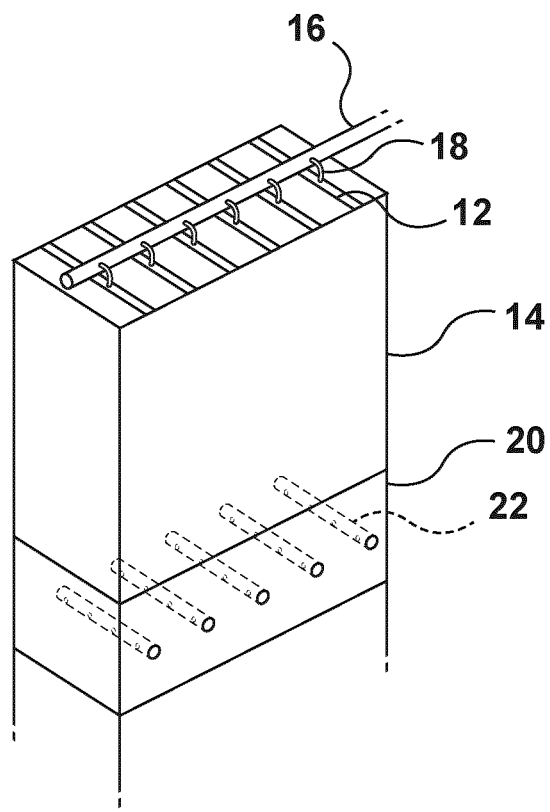
FIG. 1 shows a prior art submerged membrane unit.

FIG. 1 shows a submerged membrane unit (SMU) 10 as known in the prior art. The SMU 10 has a plurality of membrane cartridges 12 located in a membrane case 14. In this example, the membrane cartridges 12 have flat sheet membranes made of a polymeric membrane coated on a non-woven textile substrate placed one on either side of a frame. The membrane cartridges 12 are oriented vertically so as to form a series of spaced-apart parallel membranes. Permeate is drawn by suction applied to a manifold 16 that is in turn connected through tubes 18 to the insides of the membrane cartridges 12. The membrane case 14 has non-porous vertical walls surrounding the membrane cartridges 12. A diffuser case 20 is mounted below the membrane case 14. The diffuser case 20 is made of non-porous vertical walls extending downwards from the walls of the membrane case 14. A set of diffuser pipes 22 is located below the membrane case 14, mounted to the bottom of the diffuser case 20. Each diffuser pipe 22 has a set of holes for discharging bubbles spaced, for example one every 5 to 20 cm, along its length. In use, the SMU 10 is placed at the bottom of a tank and submerged in water to be filtered through the membrane cartridges 12. Bubbles of air from the diffuser pipes 20 help prevent fouling of the membrane cartridges 12. However, the diffuser pipes 22 are prone to clogging, for example due to fibrous materials that attach to them, large solids that flow past them, or suspended solids that dry out around the holes. When one or more holes of a diffuser pipe 22 is clogged, parts of the membrane cartridges 12 above these holes foul and the spaces between adjacent membrane cartridges 12 may become filled with de-watered sludge.

Figure 2:
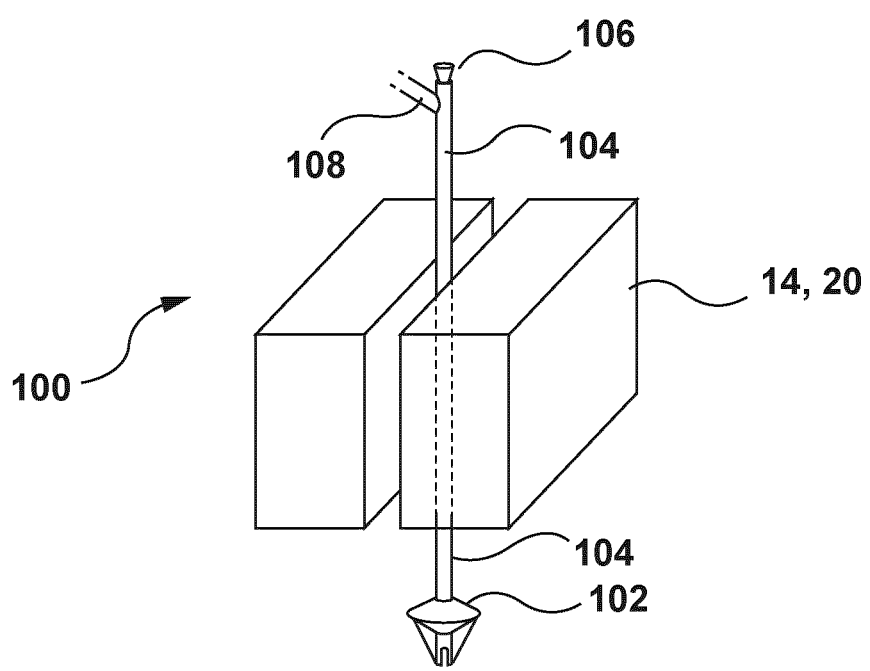
FIG. 2 shows a submerged membrane unit with point form diffusers.

FIG. 2 shows a system with a set of alternative SMUs 100. The alternative SMU 100 has membrane cartridges 12 for example as described above (not visible) inside of a membrane case 14. The alternative SMUs 100 may also have diffuser cases 20.

Drop pipe 104 carries air to a diffuser 102, thereby optionally avoiding the presence of any laterally extending aerator (alternatively called a sparger or diffuser) or pipe supplying air to an aerator. The diffuser 102 may be located below the membrane case 40 but optionally at least in part beside the membrane case 40 in plan view. In another option, the sides of the membrane case 14 and diffuser case 20, if any, may be indented to accommodate some or all of a drop pipe 104 to reduce or eliminate the space between adjacent membrane cases 40. A supply pipe 108 connects the drop pipe 104 to an air supply header (not shown). An orifice device 106 provides an adjustable restriction to air flowing into the drop pipe 104. The orifice device 106 may be removed and, when removed, reveals a port in the drop pipe 104 through which a fluid such as water, or air and water in a two-phase mixture, can be pumped downwards through the drop pipe 104 to clean the diffuser 102. The orifice device 106 may be located above the membrane case, optionally also above the water line. In this way, although the diffuser 102 rarely clogs, each diffuser 102 may be cleaned separately which typically requires less flushing fluid than cleaning multiple diffusers or a diffuser in the form of a pipe with holes spaced along it as in diffuser pipe 22.

The diffuser 102 may be a point form diffuser, meaning a diffuser that emits bubbles in a pattern that, generally speaking, radiates outwards from a point. Commercially available point form diffusers are often called drop diffusers and typically have a series of open bottomed air release slots spaced around the open bottom of a vertically oriented conduit. The vertically oriented conduit is typically formed within a molded plastic part that can include one or more vertical, horizontal or slanted plates or vanes to direct the air and/or break up a stream of air emitted from a slot into bubbles or smaller bubbles. In contrast to a diffuser pipe 22, a point form diffuser tends to have a higher air flow rate through any opening or openings potentially in contact with water in the tank. This tends to reduce the chance of solids fouling the openings of the diffuser 102. Further, the plan view area of the diffuser 102 is reduced relative to a pipe, particularly when air is supplied through a vertical pipe such as drop pipe 104. Further, the entire plan view area of the diffuser 102 may be awash in bubbles. Further, the openings of the diffuser 102 may be open-bottomed slots formed in the open bottom of a vertical air conduit. These aspects of the diffuser 102 tend to inhibit fibers and other solids from collecting on the body of the diffuser 102. The diffuser 102 may be of a type ordinarily used to mix or aerate mixed liquor tanks, waste sludge processing tanks, aerobic digesters or anaerobic digesters. For example, the diffuser 102 may be the ABS lower diffuser from an MS or TRANSMAX diffuser assembly by Enviroquip, a diffuser as described in U.S. Pat. Nos. 4,863,644 or 4,720,360, a G-O diffuser from G-H Systems Inc. or a 25 mm or 50 mm single drop diffuser from Xylem.

Figure 4:
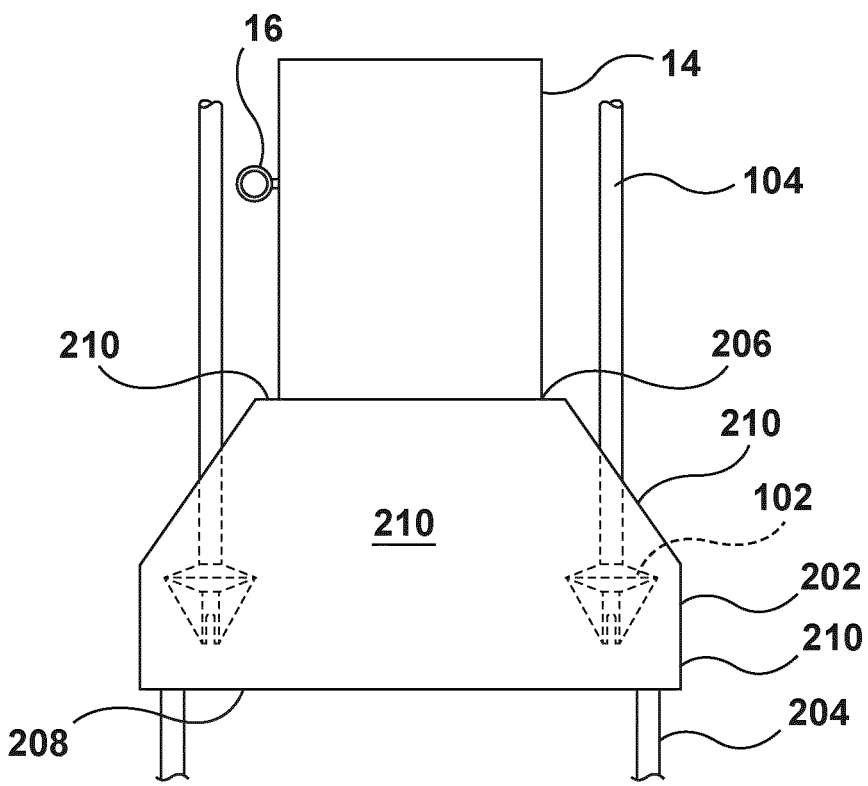
FIG. 4 shows a side view of the submerged membrane unit, diffuser case and diffusers of FIG. 3 with one side of the diffuser case removed to show the diffusers within it.
Figure 5:
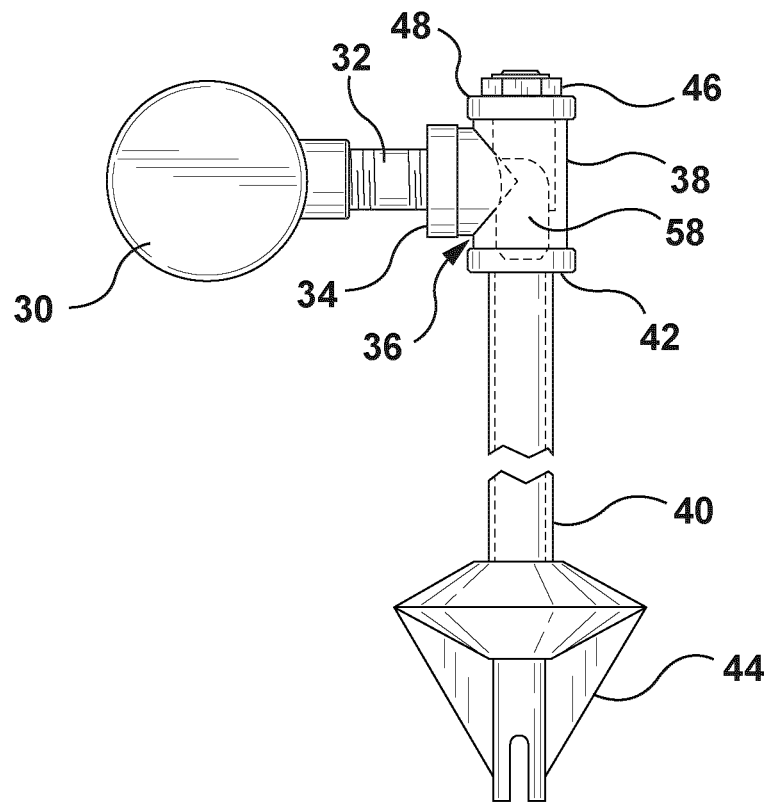
FIG. 5 shows a prior art single drop pipe diffuser assembly that may also be used to provide the diffusers of FIGS. 2, 3 and 4.
Figure 6:
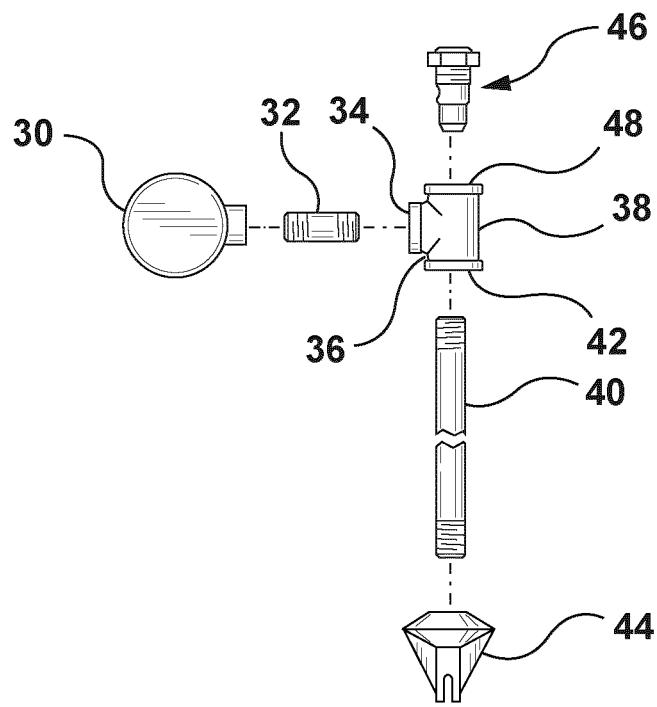
FIG. 6 is an exploded view of the single drop pipe diffuser assembly of FIG. 5.

FIGS. 5 and 6 show, for example, a single drop diffuser assembly described in U.S. Pat. No. 4,720,360, which may be used to provide the diffuser 102, drop pipe 104 and orifice device 106. In the example of FIGS. 5 and 6, fluid manifold 30 is connected through nipple 32 to third port 34 of T-joint 36, all of which are located above the water line. A fluid injection pipe 40 (which provides an example of drop pipe 104 in FIGS. 2, 3 and 4) engages the lower end port 42 of the run 38 of T-joint 36. An orifice 46 (which provides an example of orifice device 106 in FIGS. 2, 3 and 4) with a channel 58 engages the top end port 48 of the run 38 of T-joint 36 and directs air supplied from fluid manifold 30 to fluid injection pipe 40. The orifice 46 is located above the water line. The orifice 46 is threaded into the top end port 48 and can be optionally removed to open or expose the top end port 48, which optionally enables flushing water to be injected into fluid injection pipe 40 through the top end port 48. A diffuser head 44 (which provides an example of diffuser 102 in FIGS. 2, 3 and 4) is attached to the bottom of the fluid injection pipe 40. The diffuser head 44 has an internal conduit extending through the diffuser head 44 that directs air from the fluid injection pipe 40 to the open bottom of the diffuser head 44. Air is emitted from slots in the bottom of the diffuser head 44 or from the slots and from the open bottom of the conduit within the diffuser head 44.

Figure 3:
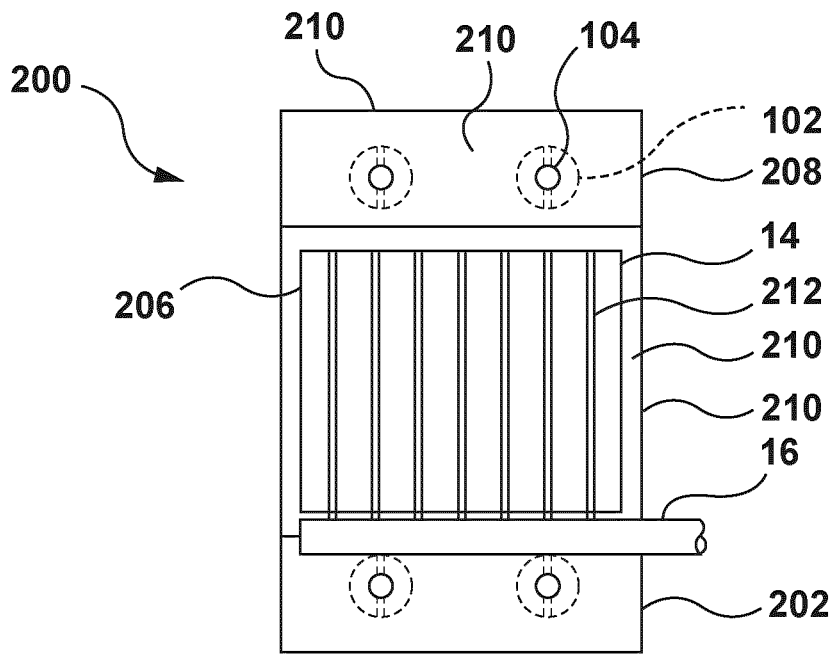
FIG. 3 shows a plan view of a submerged membrane unit having point form diffusers in a diffuser case.

FIGS. 3 and 4 show a second alternative SMU 200. The second alternative SMU 200 has ceramic membrane cartridges 212. The ceramic membrane cartridges 212 may have, for example, flat plate silicon carbide membranes, optionally with pores in the microfiltration or ultrafiltration range. These membranes are resistant to fouling and also mechanically robust, and are particularly useful in applications that may require intense aeration, for example treating high solids wastewater. Ceramic membranes are less likely than polymeric membranes to be damaged by intense aeration as provided by point form diffusers, particularly near the diffuser. Ceramic membrane cartridges 212 may also be used in the alternative SMU 100 of FIG. 2. Subject to a possible need to limit the air flow provided or move the diffuser 102 further away from the membrane cartridges to reduce mechanical stress on the membranes, membrane cartridges 12 as described above may be used in second alternative SMU 200. Other sorts of membranes, for example hollow fiber membranes or tubular polymeric or ceramic membranes, might also be used in alternative SMU 100 or second alternative SMU 200.

The ceramic membrane cartridges 212 are located in a membrane case 14. Permeate is collected, in this example, through suction applied to manifolds 16. The manifolds 16 are located outside of the membrane case 14 but connected in fluid communication with the insides of the ceramic membrane cartridges 212 through passages (not visible) in the membrane case 14. A plurality of diffusers 102 as discussed above are provided below the ceramic membrane cartridges 212. The diffusers 102 are connected to the bottom of drop pipes 104. The drop pipes 104 may be connected to an air supply pipe through control orifice devices 106 as described in FIG. 2.

The diffusers 102 may be located partially, mostly or completely outside of the plan view area of the membrane cartridges 212 or the membrane case 14. In the example shown, the diffusers 102 are provided outside of the plan view area of the membrane case 14.

The diffusers 102 are optionally located in or below a second diffuser case 202. The second diffuser case 202 shown has an upper opening 206 that generally corresponds with the size and shape of membrane case 14. A lower opening 208 of the second diffuser case 202 extends beyond the plan view area of the upper opening 206 to accommodate the diffusers 102. Preferably, the lower opening 208 extends horizontally over at least some, optionally all, of the diffusers 102. In the example shown, four diffusers 102 are located one in each corner of the second diffuser case 202.

The second diffuser case 202 has walls 210 between the upper opening 206 and the lower opening 208. Some of the walls 210 extend horizontally or on a slant to accommodate the larger size of the lower opening 208. Bubbles released in the second diffuser case 202 or below the lower opening 208 are directed by the second diffuser case 202 to flow into the membrane case 14. In other examples, only one wall 210 or all of the walls 210 could have a horizontal or slanted portion to accommodate the larger size if the lower opening. In other examples, one or more walls 210 could have a portion transitioning from a straight wall to a curved wall, for example to provide a rectangular (which may include square) in plan view lower opening 208 below a round in plan view membrane cartridge or membrane case. In other options, a membrane module is used with a diffuser case but without a membrane case. In other options, a membrane case and a diffuser case can be provided in one piece or an integrated assembly.

Optionally, legs 204 can be added to the second diffuser case 202 to facilitate resting the second alternative SMU 200 on the floor of a tank.

The SMU 100 or SMU 200 can be operated in a membrane bioreactor (MBR), which may involve operating in mixed liquor having suspended solids in the range of 8,000 to 18,000 mg/L. The risks of membrane fouling increase at higher suspended solids concentrations. However, the SMU 100 or SMU 200, particularly when containing ceramic membrane cartridges 212, may be operated in water, for example mixed liquor or sludge, with a suspended solids concentration of, for example, 18,000 mg/L or more, 25,000 mg/L or more or 30,000 mg/L or more, as used for example when thickening or digesting sludge such as waste activated sludge.

In a pilot study, a Cembrane SICFM 6040-DO-T-M4 submerged membrane unit was used to thicken waste activated sludge from a municipal wastewater treatment plant. This unit has cassettes or modules each containing a set of reaction bonded silicon carbide flat sheet membrane elements. The membrane elements are oriented vertically and spaced apart horizontally. The cassettes are stacked vertically. The unit has a surface area of about 260 square feet (24 $m^2$), or 65 square feet (6 $m^2$) per cassette. The unit is 620 mm wide, 670 mm long and 774 mm high (without diffuser case). Plan view area of the membrane elements and membrane case, both measured in this example at the inside of the membrane case, is about 0.3 $m^2$.

The standard diffuser case of the module was removed and replaced with a diffuser case and four diffusers as shown in FIGS. 3 and 4. Each diffuser was the lower diffuser (similar to diffuser head 44 in FIGS. 5 and 6) from a TRANSMAX diffuser assembly. The four diffusers were mounted one in each corner of the diffuser case, outside of the plan view area of the module case, each at the bottom of a vertical air supply pipe. Air was provided at 50-55 scfm (85-93 $m^3$/h) total, divided evenly to provide about 12-14 scfm (20-24 $m^3$/h) per diffuser. Permeate flow rates were in the range of 4-5 gpm (0.9-1.1 $m^3$/hr). Suspended solids concentration in the tank ranged from 25,000 to over 30,000 mg/L. Flux ranged from 15 to over 25 GFD (25 to over 42 LMH). The pilot operated reliably over sustained periods of time within the process parameters described above.

In similar tests, an M-8 unit was used in place of the M-4 unit and operated under similar conditions. The M-8 unit had the same plan view area as the M-4 module, but twice the height and membrane surface area due to having 8 cassettes stacked vertically rather than 4. In these tests, the same air flow rate of 50-55 scfm (85-93 $m^3$/h) total, divided evenly to provide about 12-14 (20-24 $m^3$/h) scfm per diffuser, was used. Suspended solids concentration in the tank ranged from 25,000 to over 30,000 mg/L. Flux ranged from 15 to over 25 GFD (25 to over 42 LMH). The pilot operated reliably over sustained periods of time within the process parameters described above both with and without backwashing.

The specific air flow per unit membrane area (optionally called SADm) is calculated by dividing the air flow rate, for example in cubic meters per hour, by the membrane area, for example in square meters, that receives the air. Typical values for polymeric hollow fiber membranes may be about 0.36 $m^3/m^2$/hr and up to 1.2 $m^3/m^2$/hr for polymeric flat sheet membranes. The SADm when using ceramic flat sheet membranes may be 1.5 $m^3/m^2$/hr or 3.0 $m^3/m^2$/hr or more. In the pilot testing described above with the M-4 unit, the SADm varied between 3.5 to 3.9 $m^3/m^2$/hr.

Useful operation might also be achieved within a range of 50% of the lower limit to 150% of the upper limit of any one or more of the process parameters (i.e. solids concentration, permeate flow rate, flux and/or air flow rate) used in the pilot study. For larger or smaller plants, these parameters could be normalized to a unit footprint (horizontal plan view area) of the membrane case or membrane elements for scaling purposes. However, since plan view area of the module does not change with the number of cassettes in a stack, the same airflow rate and flux might be used with modules having 1 to 15 cassettes in a stack. Accordingly, when scaling permeate flow rate would also need to be adjusted according to the number of cassettes in a vertical stack.

In a sludge thickening or digestion process, air flow rates may be 140 m³/h per m² of membrane element or membrane case plan view area or more, 210 m³/h per m² of membrane element or membrane case plan view area or more, or 280 m³/h per m² of membrane element or membrane case plan view area or more; or 10 scfm or more, 15 scfm or more or 20 scfm or more per point form diffuser; or both. These parameters can be used, in particular, when using ceramic flat sheet membranes, such as silicon carbide membranes, to treat water with suspended biomass (i.e. mixed liquor or sludge) with 18,000 mg/L or more of suspended solids, for example to thicken sludge to at least 25,000 mg/L suspended solids while operating at a flux of at least 15 GFD.

We claim:

1. A diffuser case for a submerged membrane unit having, one or more walls extending between an upper opening and a lower opening, wherein the lower opening extends horizontally beyond the plan view area of the upper opening in at least one direction; and, one or more diffusers located above the lower opening.

2. The diffuser case of claim 1 comprising a slanted wall over at least part of the extension of the lower opening in the at least on direction.

3. The diffuser case of claim 1 wherein the one or more diffusers are located at least in part in the extension of the lower opening in the at least one direction.

4. The diffuser case of claim 1 wherein the one or more diffusers are located entirely outside of the plan view area of the upper opening.

5. A submerged membrane unit comprising a plurality of membrane cartridges and one or more drop diffusers located at least in part outside of the plan view area of the membrane cartridges.

6. The submerged membrane unit of claim 5 wherein the one or more drop diffusers are mounted to one or more drop pipes extending downwards beside or between the membrane cartridges, wherein there is one drop pipe for each drop diffuser.

7. The submerged membrane unit of claim 6 wherein each of the one or more drop pipes comprises or is in communication with an orifice or port above the submerged membrane unit, wherein there is one orifice or port for each drop pipe.

8. The submerged membrane unit of claim 5 comprising a diffuser case having one or more walls extending between an upper opening and a lower opening, wherein the lower opening extends horizontally beyond the plan view area of the upper opening in at least one direction.

9. The submerged membrane unit of claim 8 wherein the one or more drop diffusers are located within the diffuser case in plan view.

10. The submerged membrane unit of claim 5 comprising ceramic flat plate membranes.

11. The submerged membrane unit of claim 5 comprising polymeric hollow fiber or flat sheet membranes.

12. A process for thickening or digesting sludge comprising immersing a submerged membrane unit of claim 5 in a tank containing mixed liquor or sludge and providing air to the diffuser.

13. The process of claim 12 wherein the mixed liquor or sludge has 18,000 mg/L suspended solids or more.

14. The process of claim 12 comprising thickening sludge to a suspended solids concentration of at least 25,000 mg/L.

15. A process of thickening and/or digesting sludge and/or mixed liquor comprising providing air to a submerged membrane unit a) through one or more drop diffusers, b) at a flow rate of 140 m3/h per m2 of membrane element or membrane case plan view area or more or c) at an SADm of 1.5 m3/m2/hr or more to the submerged membrane unit.

16. The process of claim 15 wherein the submerged membrane unit has ceramic flat sheet membranes.

17. The process of claim 15 comprising operating the submerged membrane unit at a flux of at least 15 GFD.

18. The process of claim 15 wherein the mixed liquor or sludge has 18,000 mg/L suspended solids or more.

19. The process of claim 15 comprising thickening sludge to at least 25,000 mg/L suspended solids.

20. The process of claim 15 comprising providing air through one or more drop diffusers.

* * * * *